US012069153B2

(12) United States Patent
Agrawal et al.

(10) Patent No.: US 12,069,153 B2
(45) Date of Patent: Aug. 20, 2024

(54) ABBREVIATED HEADER COMMUNICATION

(71) Applicant: MAXLINEAR, INC., Carlsbad, CA (US)

(72) Inventors: Abhishek Kumar Agrawal, Fremont, CA (US); Sigurd Schelstraete, Menlo Park, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 38 days.

(21) Appl. No.: 17/109,547

(22) Filed: Dec. 2, 2020

(65) Prior Publication Data

US 2022/0174134 A1 Jun. 2, 2022

(51) Int. Cl.
*H04L 69/22* (2022.01)
*H04L 5/00* (2006.01)
*H04L 45/02* (2022.01)
*H04L 49/901* (2022.01)

(52) U.S. Cl.
CPC .......... *H04L 69/22* (2013.01); *H04L 5/0055* (2013.01); *H04L 45/02* (2013.01); *H04L 49/901* (2013.01)

(58) Field of Classification Search
CPC ....... H04L 69/22; H04L 5/0055; H04L 45/02; H04L 49/901; H04L 69/04; H04W 28/06
See application file for complete search history.

(56) References Cited

U.S. PATENT DOCUMENTS

| | | | |
|---|---|---|---|
| 8,493,974 B1* | 7/2013 | Nelson | H04L 49/10 370/392 |
| 10,005,939 B2* | 6/2018 | Kurita | C09K 5/045 |
| 10,263,738 B2 | 4/2019 | Sun et al. | |
| 10,318,470 B1* | 6/2019 | Kugel | G06F 13/4282 |
| 10,469,404 B1* | 11/2019 | Mao | H04L 67/16 |
| 10,645,576 B1* | 5/2020 | Deshmukh | H04L 63/065 |
| 11,678,207 B1* | 6/2023 | Andreoli-Fang | H04W 24/02 455/450 |
| 2003/0110169 A1* | 6/2003 | Zuili | H04L 67/42 707/999.009 |
| 2003/0179713 A1* | 9/2003 | Fleming | H04L 61/10 370/252 |
| 2004/0136476 A1* | 7/2004 | Rosen | H04L 69/04 375/340 |
| 2005/0086481 A1* | 4/2005 | Winget | H04L 63/062 713/176 |
| 2005/0165950 A1* | 7/2005 | Takagi | H04L 69/323 709/236 |
| 2007/0058679 A1* | 3/2007 | Pelletier | H04L 69/04 370/477 |
| 2007/0127433 A1* | 6/2007 | Yeh | H04W 28/06 370/349 |

(Continued)

*Primary Examiner* — Otis L Thompson, Jr.
(74) *Attorney, Agent, or Firm* — Buchalter; Jason W. Croft

(57) ABSTRACT

Methods and systems may include processes that may implement abbreviated header communications. In some implementations, a method may include generating a packet including an abbreviated header, where the abbreviated header may include a pointer corresponding to values for multiple parameters associated with a physical layer of communication rather than the values for the multiple parameters. The method may also include transmitting the packet to a client device according to the values for the multiple parameters.

11 Claims, 6 Drawing Sheets

(56) References Cited

U.S. PATENT DOCUMENTS

| | | | |
|---|---|---|---|
| 2008/0117906 A1* | 5/2008 | Xie | H04L 69/22 370/477 |
| 2008/0207120 A1* | 8/2008 | Kurina | H04W 28/06 455/39 |
| 2009/0074010 A1* | 3/2009 | Kwon | H04L 1/007 370/474 |
| 2010/0107239 A1* | 4/2010 | Zhao | H04L 63/0236 726/13 |
| 2010/0142560 A1* | 6/2010 | Sharivker | H04L 69/04 370/477 |
| 2011/0019617 A1* | 1/2011 | Ho | H04W 28/06 370/328 |
| 2012/0307842 A1* | 12/2012 | Petrov | H04L 49/9094 370/474 |
| 2013/0064235 A1* | 3/2013 | Burra | H04W 28/06 370/310 |
| 2013/0294431 A1* | 11/2013 | Wang | H04W 72/04 370/338 |
| 2013/0343185 A1* | 12/2013 | Park | H04W 28/06 370/230 |
| 2014/0119377 A1* | 5/2014 | Crosta | H04L 45/7453 370/392 |
| 2015/0071307 A1* | 3/2015 | De Smet | H04L 65/607 370/477 |
| 2015/0092881 A1* | 4/2015 | Hwang | H04L 45/74 375/295 |
| 2015/0146608 A1* | 5/2015 | Kim | H04L 1/0057 370/312 |
| 2015/0373156 A1* | 12/2015 | Singh | H04L 69/18 370/474 |
| 2017/0171070 A1* | 6/2017 | Kwon | H04L 69/22 |
| 2018/0323919 A1 | 11/2018 | Sun et al. | |
| 2019/0245659 A1 | 4/2019 | Sun et al. | |
| 2019/0297019 A1* | 9/2019 | Mudireddy | H04W 28/0273 |
| 2020/0112941 A1* | 4/2020 | Yerramalli | H04L 12/189 |
| 2022/0070103 A1* | 3/2022 | Kanamarlapudi | H04W 72/231 |
| 2023/0189066 A1* | 6/2023 | Kim | H04W 76/19 370/229 |
| 2023/0189134 A1* | 6/2023 | Jost | H04W 36/0038 726/4 |
| 2023/0189332 A1* | 6/2023 | Lin | H04L 9/40 370/392 |
| 2023/0189375 A1* | 6/2023 | Yu | H04W 74/0841 370/329 |
| 2023/0189380 A1* | 6/2023 | Palat | H04W 76/20 370/329 |

* cited by examiner

ABBREVIATED HEADER COMMUNICATION

FIELD

The implementations discussed herein are related to abbreviated header communications, and specifically to systems and methods for packetized communication in which an abbreviated header of the packets is utilized, and operations associated therewith.

BACKGROUND

Unless otherwise indicated in the present disclosure, the materials described in the present disclosure are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax", "ay", "be." Communications follow a hub and spoke model with a WAP at the hub and the spokes corresponding to the wireless links to each 'client' device or station (STA) utilizing the WLAN.

The IEEE 802.11n and 802.11ac standards support increasing degrees of complexity in the signal processing required of fully compliant WLAN nodes. Such increased complexity includes increased length of packet headers to permit signaling to accommodate the complexity.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to communicating using packets with abbreviated headers. Some implementations provide a method, system, and/or apparatus to facilitate the transmission of packets with abbreviated headers.

One or more implementations may include an example method or system that includes generating a packet including an abbreviated header, where the abbreviated header may include a pointer corresponding to values for multiple parameters associated with a physical layer of communication rather than the values for the multiple parameters. The method may also include transmitting the packet to a client device according to the values for the multiple parameters.

One or more implementations may include an example method or system that includes receiving a packet that may include an abbreviated header, where the abbreviated header may include a pointer corresponding to values for multiple parameters associated with a physical layer of communication rather than the values for the multiple parameters. The method may also include recalling the values for the multiple parameters from a stored location, and processing the packet according to the recalled values.

The present disclosure may be implemented in hardware, firmware, or software. Associated devices and circuits are also claimed. Additional features and advantages of the present disclosure will be set forth in the description which follows, and in part will be obvious from the present disclosure, or may be learned by the practice of the present disclosure. The features and advantages of the present disclosure may be realized and obtained by means of the instruments and combinations particularly pointed out in the appended claims. These and other features of the present disclosure will become more fully apparent from the following description and appended claims or may be learned by the practice of the present disclosure as set forth hereinafter.

BRIEF DESCRIPTION OF THE DRAWINGS

Example implementations will be described and explained with additional specificity and detail through the use of the accompanying drawings in which.

DETAILED DESCRIPTION OF SOME EXAMPLE IMPLEMENTATIONS

One or more implementations of the present disclosure may relate to the use of an abbreviated header when communicating between devices. For example, an access point may maintain a manager state table with entries including a pointer associated with and serving as a short-hand for values for various parameters related to the coding, modulating, and/or other processing of a packet at the physical (PHY) layer when communicating with a station. When generating a packet to a station, the packet with the abbreviated header may include the pointer rather than the corresponding values themselves. When the station receives the packet, the station may identify the pointer from the header, and obtain the values for the parameters from a client state table based on the pointer in the abbreviated header. The station may then demodulate, decode, and/or otherwise process the packet based on the values of the parameters as recalled from the client state table.

By using one or more of the principles of the present disclosure to transmit data using abbreviated headers, network performance may be improved and/or efficiencies may be gained. Additionally, the overhead associated with transmissions may be reduced. For example, by decreasing the amount of data transmitted in each packet (e.g., only the pointer is transmitted in the header instead of the values of the parameters themselves), the overall throughput of the network may be improved as there is more available air time for actual data rather than overhead explaining how to process the data. Such reductions in overhead may also decrease network congestion. Additionally or alternatively, in some implementations, data bits that were previously used as the preamble may instead carry data in duplicate, thereby improving the reliability and/or robustness of network communications.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

Figure 1:
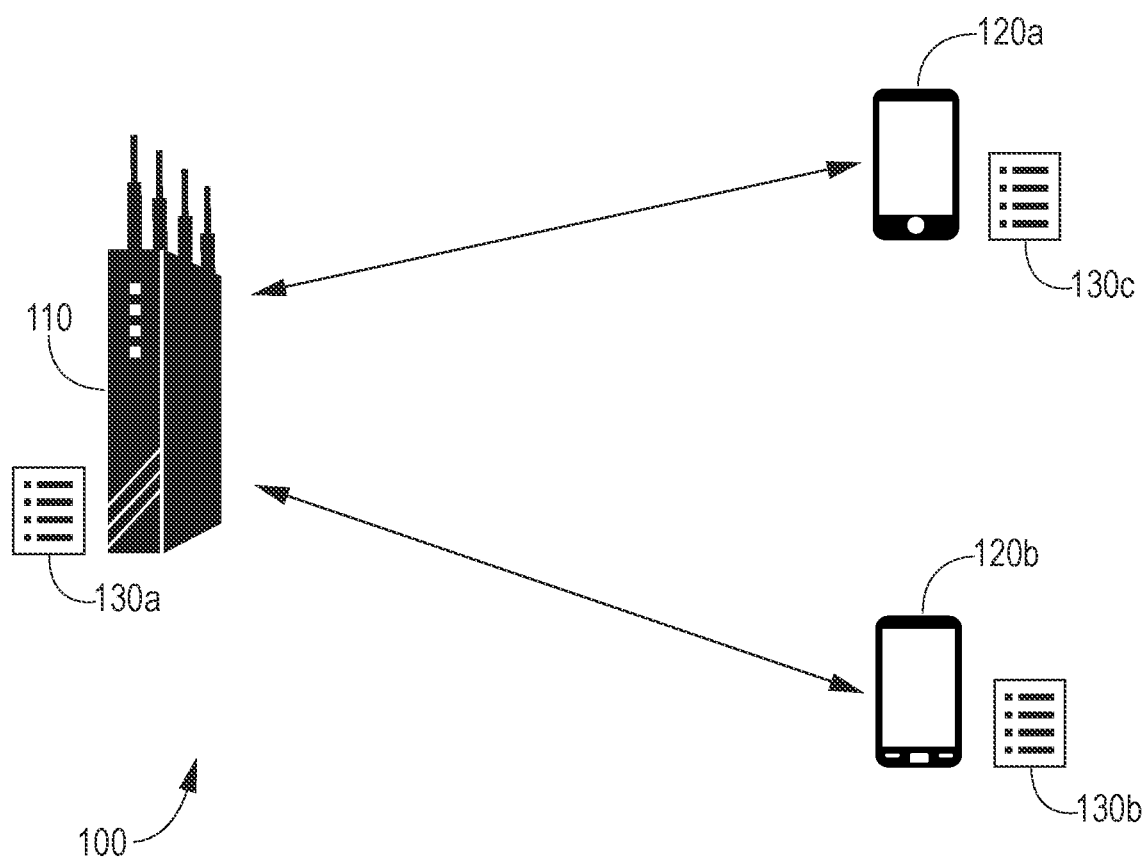
FIG. 1 illustrates an example network that may utilize abbreviated header communications, described according to at least one implementation of the present disclosure.

FIG. 1 illustrates an example network 100 that may utilize abbreviated header communications, described according to at least one implementation of the present disclosure. The network 100 may include a wireless access point 110 communicating with multiple stations 120, such as the client stations 120a and 120b. The wireless access point 110 may utilize a manager state table 130a and the client stations 120a and 120b may utilize client state tables 130c and 130b, respectively.

In operation, the access point 110 may determine a set of parameters to use when communicating with a particular station, such as the station 120a. Such determination may follow any approach or technique used by an access point 110 when determining how to transmit a packet to the station 120a in the physical layer. For example, the access point 110 may select a given bandwidth (BW), modulation and coding scheme (MCS), and/or resource unit (RU) allocation, among other parameters, when communicating the packet. Rather than including all of the determined parameters in the header of the packet to the station 120a, the access point 110 may identify the set of parameters in the state table 130a. From the state table 130a, the access point 110 may identify a pointer associated with the identified set of parameters and include the pointer in the header. By providing the pointer in the header instead of the values for all of the parameters, the overhead in network communication imposed by including such values may be reduced. For example, the pointer may provide an abbreviated header as the pointer may be included as a proxy for the set of values for the parameters.

When the packet with the pointer is received at the station 120a, the station 120a may identify the pointer in the header of the packet and refer to the state table 130c of the station 120a to obtain the values for the parameters corresponding to the pointer. The station 120a may then use the values for the parameters in decoding, demodulating, and/or otherwise processing and interpreting the packet. An example of communicating with the abbreviated header may be described with greater detail with reference to FIG. 2.

In some implementations, the parameters in the state tables 130 may be associated with the physical layer of communication (e.g., the PHY layer). For example, the parameters may include any combination of modulation and coding scheme (MCS), a number of space time streams (NSTS), one or more length fields corresponding to various portions of the packet (e.g., header length, entire packet length, etc.), a bandwidth (BW), resource unit (RU) allocation, a type of protocol and/or protocol version, a type of packet (e.g., control, data, management), a power management setting, whether or not the packet is part of a multi-user (MU) communication, etc.

In these and other implementations, a given combination of values for a set of parameters may be frequently used together. Additionally, some combinations of values of parameters may be mutually exclusive and so may be infrequently used together, if at all. For example, the combination of being part of a MU communication and having a certain BW may constrain the NSTS available for the packet. As such, there may be a small number of combinations of parameters compared to the raw number of potential combinations that may account for the majority of packets communicated in the network 100.

In some implementations, when selecting the parameters for communicating, the access point 110 may identify a set of values for the parameters that may or may not have a corresponding entry in the state table 130a. In some implementations, if the set of values selected by the access point 110 does not have a corresponding entry in the state table 130a, the access point 110 may include the set of values for the parameters in the header of the packet and include an update indicator in the packet. When the station 120a receives a packet with an update indicator, the station 120a may update the state table 130c to reflect the updated values for an identified entry in the table 130c (or generate a new entry in the table 130c). An example of updating the table 130c may be described with reference to FIG. 3.

In some implementations, when updating the state table 130a, the access point 110 may send a corresponding message to the stations 120a and 120b such that the state tables 130b and 130c may maintain the same entries and/or the same pointers corresponding to the same values for the sets of parameters. For example, if the stations 120a and 120b participate in multi-user communications with the access point 110 (e.g., orthogonal frequency-division multiple access (OFDMA) communications), the access point 110 may instruct the stations 120a and 120b to update their respective state tables 130c and 130b. As another example, if the stations 120a and 120b are part of the same basic service set (BSS) and/or other broadcasting group, the access point 110 may instruct the stations 120a and 120b to update their respective state tables 130c and 130b.

In some implementations, the access point 110 may include separate entries for each of the stations 120a and 120b such that the state table 130a may be larger than either of the state tables 130b and/or 130c.

In some implementations, if the set of values selected by the access point 110 does not have a corresponding entry in the state table 130a, the access point 110 may select a closest set of values to the selected values and may include the corresponding pointer in the header of the packet.

Modifications, additions, or omissions may be made to the network 100 without departing from the scope of the present disclosure. For example, the designations of different elements in the manner described is meant to help explain concepts described herein and is not limiting. Further, the network 100 may include any number of other elements or may be implemented within other systems or contexts than those described. For example, any number of access points 110 and/or stations 120 may be included Additionally, the teachings are applicable to any type of wireless communication system or other digital communication systems. For example, while stations and access points are described for one context of wireless communication, the teachings of reduced overhead by using an abbreviated header are also applicable to other wireless communication such as Bluetooth®, Bluetooth Low Energy, Zigbee®, Thread, mmWave, etc.

Figure 2:
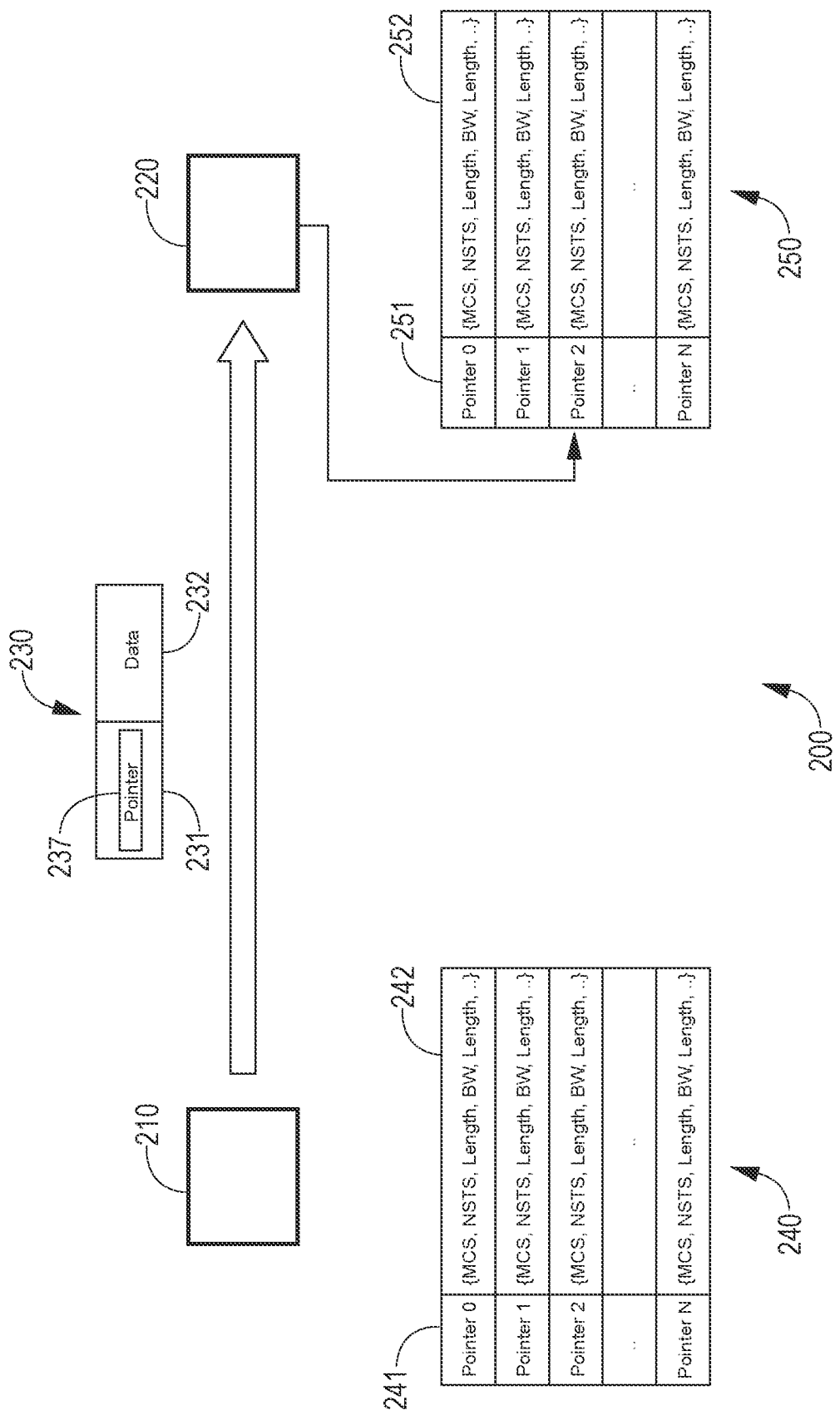
FIG. 2 illustrates another example network that may utilize a state table to facilitate abbreviated header communications, described according to at least one implementation of the present disclosure.

FIG. 2 illustrates another example network 200 that may utilize state tables to facilitate abbreviated header communications, described according to at least one implementation of the present disclosure. The network 200 may include an access point 210 that includes a manager state table 240 communicating with a station 220 that includes a client state table 250. The access point 210 may be similar or comparable to the access point 110 of FIG. 1, and the station 220 may be similar or comparable to the stations 120 of FIG. 1.

When communicating with the station 220, the access point 210 may select a set of values of parameters for processing, encoding, etc. of the packet 230 at the physical layer of communication (e.g., the PHY layer). The access point 210 may locate the set of values of parameters in the manager state table 240 in a column of values 242, and may select the corresponding pointer from a column of pointers 241.

After selecting the pointer, the access point 210 may generate and transmit the packet 230 from the access point 210 to the station 220. For example, the access point 210 may encode and/or otherwise process the data 232 of the packet and/or the header 231 of the packet 230 according to the values of the parameters corresponding to the pointer. For example, the packet 230 may be encoded according to an MCS and transmitted over the identified number of space time streams and according to the designated bandwidth.

The packet 230 may include any communication between the access point 210 and the station 220. The header 231 may include one or more fields that may contain data to facilitate communication of the packet 230 that may be compliant with one or more standards. In some implementations, one or more fields consistent with a standard (such as IEEE 802.11 standards) may be omitted or removed and instead include the pointer 237. In some implementations, the packet 230 may include user data in the data 232. Additionally or alternatively, the packet 230 may include triggering instructions, management data, or other information in the data 232.

After receiving the packet 230, the station 220 may obtain the pointer 237 from the header of the packet 230. Using the pointer 237, the station 220 may look up the pointer 237 in a column of pointers 251 in the client state table 250. After locating the pointer 237 in the column of pointers 251, the station 220 may retrieve the values of parameters associated with the pointer 237 in a column of values 252. After retrieving the values of the parameters, the station 220 may decode and/or otherwise process the data 232 of the packet 230 based on the retrieved values from the client state table 250.

Modifications, additions, or omissions may be made to the network 200 without departing from the scope of the present disclosure. For example, the designations of different elements in the manner described is meant to help explain concepts described herein and is not limiting. Further, the network 200 may include any number of other elements or may be implemented within other systems or contexts than those described.

Figure 3:
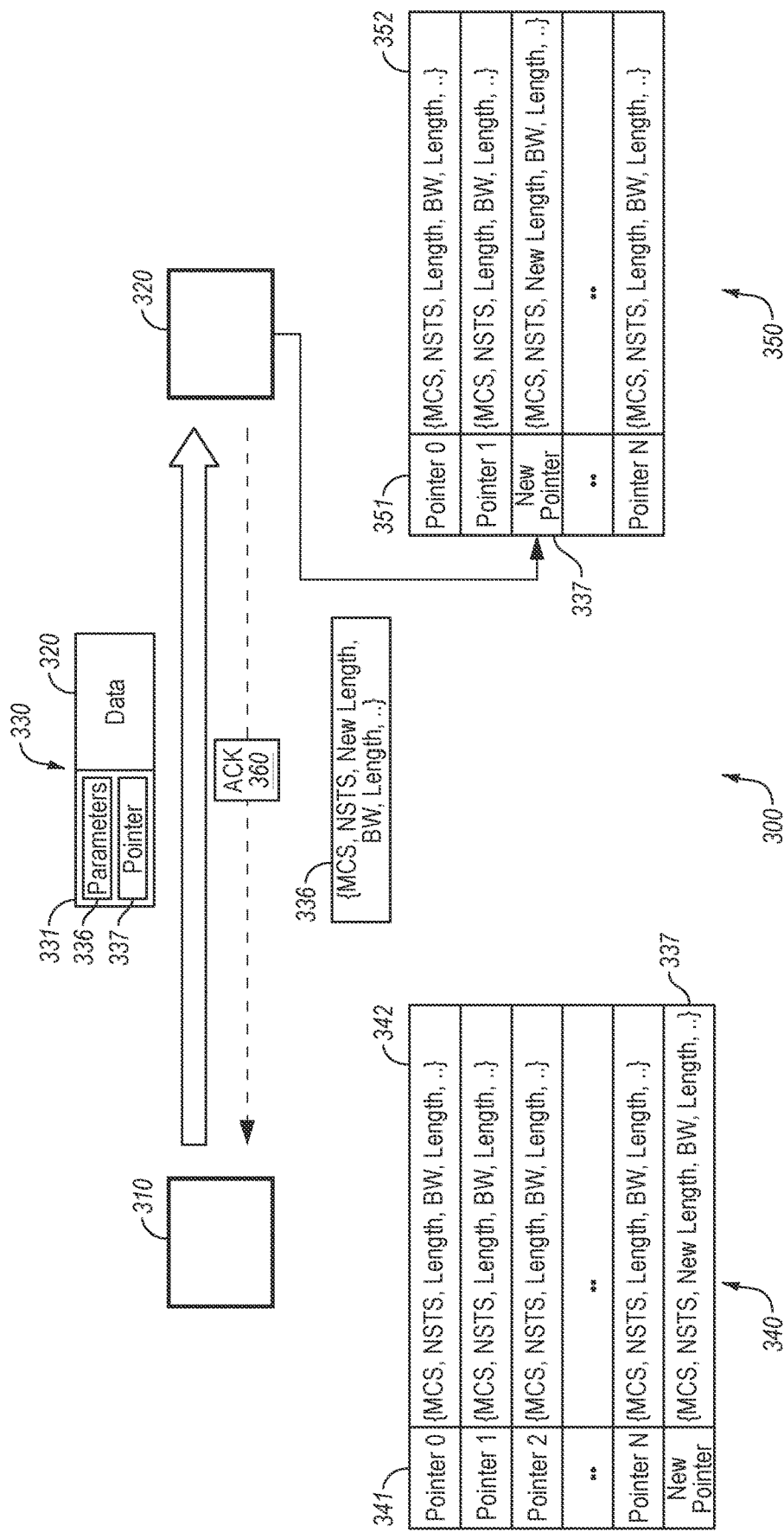
FIG. 3 illustrates another example network updating a state table to facilitate abbreviated header communications, described according to at least one implementation of the present disclosure.

FIG. 3 illustrates another example network 300 updating a state table to facilitate abbreviated header communications, described according to at least one implementation of the present disclosure. The network 300 may include an access point 310 that includes a manager state table 340 communicating with a station 320 that includes a client state table 350 using a packet 330. The access point 310 may be similar or comparable to the access point 110 of FIG. 1 and/or the access point 210 of FIG. 2, the station 320 may be similar or comparable to the stations 120 of FIG. 1 and/or the station 220 of FIG. 2, and the packet 330 may be similar or comparable to the packet 230 of FIG. 2.

When communicating with the station 320, the access point 310 may select a set of values of parameters for processing, encoding, etc. of the packet 330 at the physical layer of communication (e.g., the PHY layer). In some implementations, the access point 310 may search for the values of the parameters in the manager state table 340 and may or may not locate the values of the parameters in the manager state table 340. If the values are not located in the manager state table 340, the access point 310 may prepare the header 331 of the packet 330 to include the values 336 of the parameters in addition to the pointer 337. The access point 310 may update the manager state table 340 to include the values of the parameters and the associated pointer 337 in the column of values 342 and the column of pointers 341, respectively.

In some implementations, the header 331 may include an update indicator, conveying that the updated values 336 of the parameters are to be used to decode and/or otherwise process the packet 330. Additionally or alternatively, the update indicator may convey that the client state table 350 is to be updated with the values 336 of the parameters corresponding to the pointer 337.

After receiving the packet 330, the station 320 may obtain the pointer 337 and the values 336 of the parameters from the header of the packet 330. Additionally or alternatively, the station 320 may obtain the update indicator. Based on the inclusion of the values 336 and/or the update indicator, the station 320 may update the client state table 350 to include the pointer 337 in a column of pointers 351 in the client state table 350 with the values 336 in a column of values 352 such that the values 336 correspond to the pointer 337. In some implementations, the pointer 337 may be a pre-existing pointer in the column of pointers 351. In these and other implementations, the values 336 may replace the previous values in the client state table 350 corresponding to the pointer 337.

The station 320 may decode and/or otherwise process the data 332 of the packet 330 based on the values 336 of the parameters in the packet 330. In some implementations, the decoding and/or otherwise processing of the data 332 of the packet 330 may be performed before or after updating the client state table 350.

In some implementations, the presence of the update indicator in the packet 330 may be optional. For example, the presence of the values 336 of the parameters may serve as an update indicator. In some implementations, the pointer 337 may be optional. For example, for implementations in which the client state table 350 includes a single entry, the pointer 337 may be removed and if the values 336 of the parameters are included in the header 331, the station 320 may update the lone entry in the client state table 350 with the values included in the header 331. Additionally or alternatively, if no values 336 are included in the header 331, the station 320 may process the packet 330 based on the values of the parameters stored in the single entry of the client state table 350. In some embodiments, the packet 330 may include a single bit indicating that the packet either includes values to update the table, or that the packet is to be processed with the previously sent values.

In some implementations, the station 320 may send a confirmation message to the access point 310 indicating that the client state table 350 is updated with the values 336. The access point 310 may or may not wait to update the manager state table 340 until after receiving the confirmation message. In some implementations, an acknowledgement (ACK) message 360 may operate as the confirmation message.

Modifications, additions, or omissions may be made to the network 300 without departing from the scope of the present disclosure. For example, the designations of different elements in the manner described is meant to help explain concepts described herein and is not limiting. Further, the network 300 may include any number of other elements or may be implemented within other systems or contexts than those described.

Figure 4:
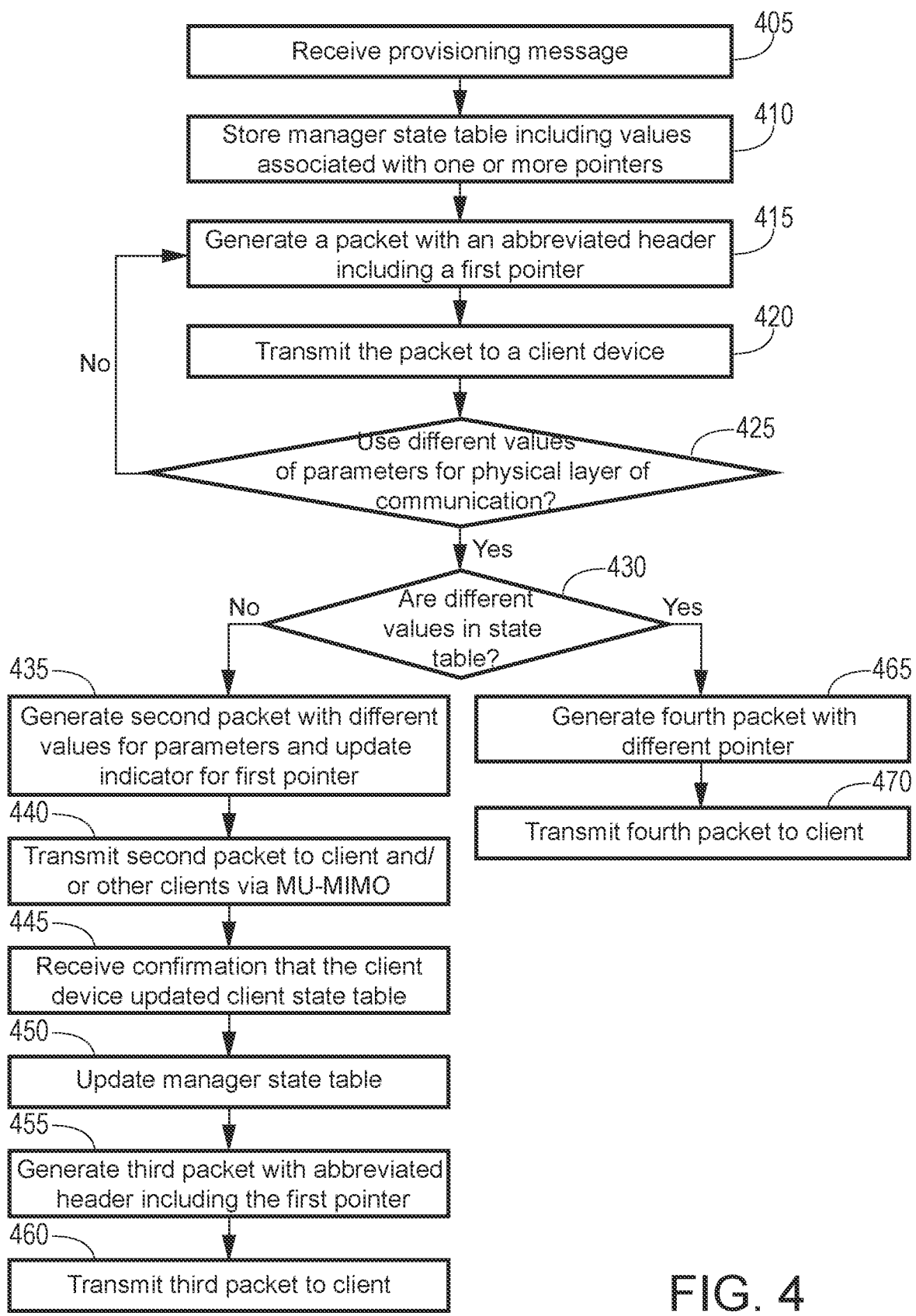
FIG. 4 illustrates a flowchart of an example method of an access point communicating using an abbreviated header, described according to at least one implementation of the present disclosure.

FIG. 4 illustrates a flowchart of an example method 400 of an access point communicating using an abbreviated header, described according to at least one implementation of the present disclosure.

At block 405, a provisioning message may be received by an access point. For example, a device manufacturer, a network administrator, a managing network device, another access point, etc. may transmit a provisioning message to the access point. The provisioning message may include a state table for use by the access point. In some implementations, when a device is first powered up or reconfigured, the access point may be provided the provisioning message as an initial version of the state table that may be utilized by and/or updated by the access point. In some implementations, another access point in the same network (such as a mesh network) may provide the access point with its current state table.

At block 410, the access point may store a manager state table that includes values for one or more parameters as associated with one or more respective pointers. For example, the access point may store the state table obtained at the block 405. In some implementations, the access point may start a blank manager state table and may store values as associated with pointers as the access point uses the values to encode and/or otherwise process packets.

At block 415, a packet may be generated with an abbreviated header that includes a first pointer. The first pointer may correspond to values for one or more parameters as stored in the manager state table stored at the block 410. In these and other implementations, the abbreviated header may include the first pointer in place of the values such that the header may be an abbreviated header as less data is included in the header as compared to a packet in which all of the values are included in the header.

In some implementations, the first pointer may be the result of a hashing function or some other many to one function that may use as its input an index or other identifier associated with the values in the manager state table corresponding to the first pointer. For example, the manager state table may include an index that may be represented by thirty two bits, and rather than using all thirty two bits as the first pointer, the access point may perform a hashing function on the thirty two bits of the index to generate the first pointer. By using such a hashing function, the overhead of transmitted data may be further reduced. In these and other implementations, in the off-chance that the hashing function generates an overlapping value that may occur in two different client state tables for two different stations, the station for which the packet is not intended may discard the packet as it is even less likely that the same values for the parameters are also represented by the same hashed value.

At block 420, the packet generated at the block 415 may be transmitted to a client device. In these and other implementations, the entry in the manager state table in which the first pointer corresponds to the values may be specific to the client device.

At block 425, a determination may be made by the access point whether or not different values for the parameters are to be used in a later communication with the client device over the physical layer (e.g., PHY layer). For example, the access point may obtain additional data to communicate to the client device, and may make a determination that a different MCS, BW, NSTS, etc. are to be used in communicating the additional data to the client device. If the determination is made that different values for the parameters are to be used in communicating with the client device, the method 400 may proceed to the block 430. If the determination is made that the same values parameters are to be used in communicating with the client device, the method 400 may return to the block 430 to generate a packet with an abbreviated header that includes the first index, the packet including the additional data.

At block 430, a determination may be made whether or not the different values for the parameters are included in the manager state table. If the different values for the parameters are not included in the manager state table, the method 400 may proceed to the block 435. If the different values for the parameters are included in the manager state table, the method 400 may proceed to the block 465.

At block 435, a second packet may be generated with the different values for the parameters and an update indicator for the first pointer. For example, the second packet may include a header with the different values for the parameters and the first pointer, with the update indicator indicating that the first pointer is to be associated with the different values for the parameters.

At block 440, the second packet may be transmitted to the client. Additionally or alternatively, the second packet with the update indicator may be transmitted to the client and/or other clients via a multi-user communication, such as by a multi-user multi input multi-output (MU-MIMO) communication. In some implementations, by providing the packet with the update indicator, each of the stations within a broadcasting group may maintain the same entries in the respective client state tables for each of the stations. For example, all of the stations within a given basic service set (BSS) and/or a given color of BSS may maintain common entries in the client state tables for the stations in the BSS and/or color of BSS.

At block 445, a confirmation may be received that the client device updated the client state table. For example, after updating the client state table, the client device may generate and transmit a message indicating that the client state table is updated with the updated values for the parameters included in the second packet. Additionally or alternatively, the client device may submit an ACK message indicating that the second packet was received and processed. In some implementations, a confirmation message may be received from some or all of the stations to which the second packet was transmitted at the block 440.

At block 450, the manager state table may be updated with the values for the parameters included in the second packet and as corresponding to the first pointer. For example, based on the client device and/or the other stations providing confirmation that the client state tables of the client device and/or the other stations is updated, the manager state table may be updated. In some implementations, the manager state table may be provisionally updated based on the generation of the second packet and may be finalized after receiving the confirmations. In some implementations, the manager state table may be updated based on a threshold number of confirmation messages being received (e.g., half of the stations in a given BSS providing confirmation messages). In some implementations, the manager state table may be updated immediately upon associating the first pointer with the values (e.g., at the block 430).

At block 455, a third packet may be generated with an abbreviated header that includes the first pointer. For example, the third packet may include the abbreviated header that omits the updated values of the parameters and includes instead the first pointer.

At block 460, the third packet may be transmitted to the client. For example, because the manager state table includes the updated values as associated with the first pointer, the third packet may be encoded, processed, transmitted, etc. according to the updated values of the parameters as stored in the updated manager state table.

At block 465, based on the different values of the parameters being included in the state table, a fourth packet may be generated with a different pointer than the first pointer, where the different pointer may correspond to the different values of the parameters in the manager state table. For example, a row different than the row corresponding to the first pointer in the manager state table may include the different values parameters. Based on such values already being in the manager state table, the corresponding pointer to those values (e.g., the different pointer) may be included in an abbreviated header of the fourth packet.

At block 470, the fourth packet may be transmitted to the client device. For example, because the manager state table includes the different values as associated with the different pointer in the abbreviated header, the fourth packet may be encoded, processed, transmitted, etc. according to the different values of the parameters as stored in the updated manager state table.

Figure 5:
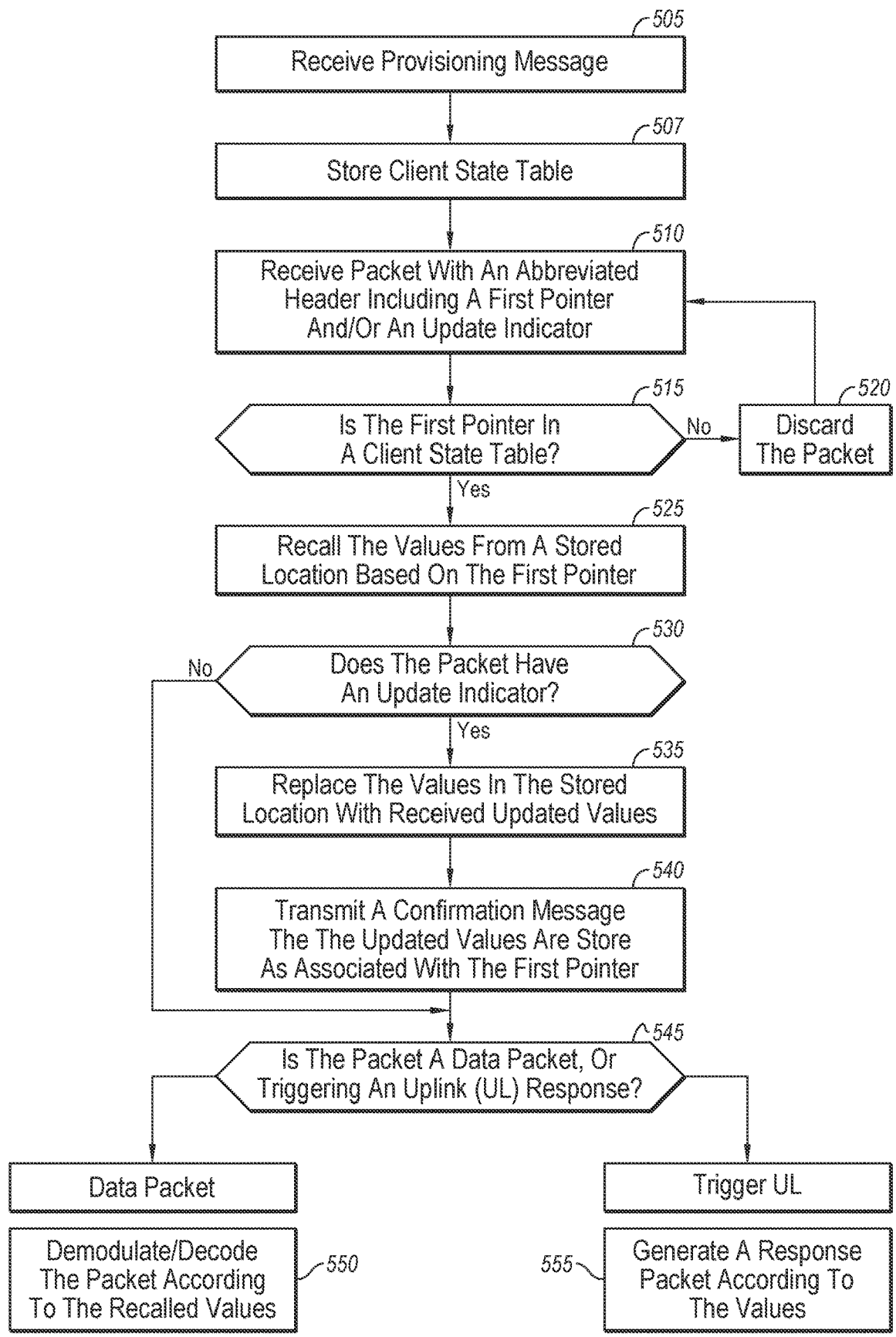
FIG. 5 illustrates a flowchart of an example method of a client device communicating using an abbreviated header, described according to at least one implementation of the present disclosure.

FIG. 5 illustrates a flowchart of an example method 500 of a client device communicating using an abbreviated header, described according to at least one implementation of the present disclosure.

At block 505, a provisioning message may be received by a station. For example, a device manufacturer, a network administrator, a managing network device, an access point, etc. may transmit a provisioning message to the station. The provisioning message may include a state table for use by the station. In some implementations, when a device first joins a wireless network, is first powered up, etc., the station may be provided the provisioning message as an initial version of the state table that may be utilized by and/or updated by the station. In some implementations, the state table provided in the provisioning message may be based on the BSS to which the station belongs.

At block 507, the state table for use by the station may be stored as a client state table. The client state table may include values associated with one or more pointers, such as the initial version of the state table as communicated by the provisioning message of the block 505.

At block 510, a packet may be received with an abbreviated header including a first pointer and/or an update indicator. For example, the packet may be transmitted to the station from an access point according to the values of the parameters associated with the first pointer in the abbreviated header instead of the values themselves. As another example, the packet may include an update indicator indicating that an update to a client state table may be undertaken.

At block 515, a determination may be made whether the first pointer is in a client state table of the station. If the first pointer is not in the client state table, the method 500 may proceed to the block 520. If the first pointer is in the client state table, the method 500 may proceed to the block 525.

At block 520, based on the first pointer not being in the client state table, the packet may be discarded. For example, if the client state table does not include values associated with the first pointer, the station may be unable to decode and/or otherwise process the packet and the packet may be discarded. Additionally or alternatively, if the first pointer does appear in the client state table but the station is unable to decode and/or otherwise process the packet, the packet may be discarded. For example, the first pointer may include a hashed value of an index associated with different values for communicating with a different station by the access point such that the station may be unable to decode and/or otherwise process the packet.

At block 525, based on the first pointer being in the client state table, the values associated with the first pointer may be recalled from a stored location. For example, the values associated with the first pointer may be recalled from a client state table stored in the station at the stored location.

At block 530, a determination may be made whether the packet includes an update indicator. For example, the header of the packet may include the updated indicator. In these and other implementations, if the packet includes an update indicator, the packet may or may not include an abbreviated header. If the packet does include an update indicator, the method 500 may proceed to the block 535. If the packet does not include an update indicator, the method 500 may proceed to the block 545.

At block 535, the values associated with the first pointer in the stored location may be replaced with received updated values. For example, the packet with the updated indicator may include replacement values to be associated with the first pointer in the client state table. The original values may be discarded and/or overwritten by the updated values such that when a lookup is performed in the client state table for values associated with the first pointer, the updated values are recalled.

At block 540, a confirmation message that the updated values are stored as associated with the first pointer may be transmitted to the access point. For example, based on updating the values in the client state table, the confirmation message may be transmitted to the access point. In some implementations, the confirmation message may be based on the station using the updated values to demodulate, decode, and/or otherwise process the packet.

At block 545, a determination may be made whether the packet is a data packet, or is triggering an uplink (UL) response. For example, the packet may include user data for the station. Additionally or alternatively, the packet may trigger a response to be sent to the access point via the UL channel. If the packet is a data packet, the method 500 may proceed to the block 550. If the packet triggers an UL response, the method 500 may proceed to the block 555.

At block 550, the packet may be demodulated, decoded, and/or otherwise processed according to the recalled values for the parameters. For example, if the packet included an abbreviated header with the first pointer instead of the values associated with the first pointer, the packet may be demodulated, decoded, and/or otherwise processed according to the values recalled from the client state table. In some implementations, if the packet includes an update indicator, the demodulation, decoding, and/or otherwise processing may be performed according to the values included in the packet. Such operations may occur before or after updating the client state table at the stored location with the updated values. In some implementations, at the completion of such operations, an ACK or other confirming message may be sent indicating the data was received.

At block 555, a response packet may be generated and/or transmitted via an UL channel according to the values. For example, a high throughput (HT) physical layer protocol data unit (PPDU) may be triggered that may be processed and/or transmitted according to the values as recalled from the client state table.

One skilled in the art will appreciate that, for these and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1. A method includes generating a packet including an abbreviated header, the abbreviated header including a pointer corresponding to values for multiple parameters associated with a physical layer of communication rather than the values for the multiple parameters; and transmitting the packet to a client device according to the values for the multiple parameters.

Example 2. Another method includes receiving a packet including an abbreviated header, the abbreviated header including a pointer corresponding to values for multiple parameters associated with a physical layer of communication rather than including the values for the multiple parameters; recalling the values for the multiple parameters from a stored location; and processing the packet according to the recalled values.

Example 3. An example system includes one or more processors, and one or more non-transitory computer-readable media containing instructions that, when executed by the one or more processors, cause the system to perform operations. The operations may include generating a packet including an abbreviated header, the abbreviated header including a pointer corresponding to values for multiple parameters associated with a physical layer of communication rather than the values for the multiple parameters; and transmitting the packet to a client device according to the values for the multiple parameters.

Figure 6:
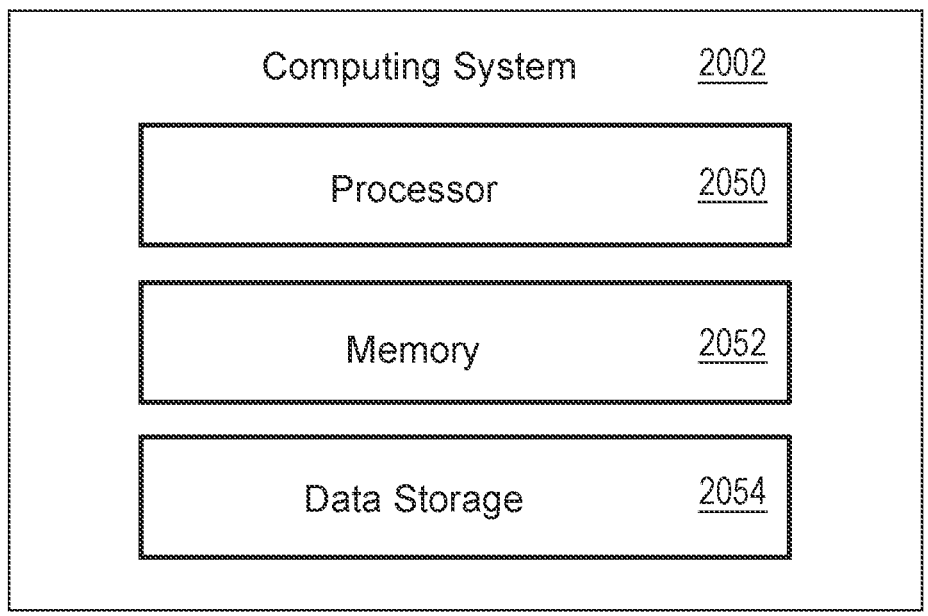
FIG. 6 illustrates a block diagram of an example computing system that may be used to perform or direct performance of one or more operations described according to at least one implementation of the present disclosure.

FIG. 6 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSP's, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
generating a packet including an abbreviated header, the abbreviated header including a pointer corresponding to values for multiple parameters associated with a physical layer of communication rather than including the values for the multiple parameters, the pointer being generated by performing a many-to-one mapping function on a pointer of a manager state table corresponding to the values for multiple parameters, the pointer corresponding to a client state table pointer of a client device corresponding to the values for multiple parameters, a range of the client state table smaller than a range of the manager state table; and
transmitting the packet to a client device according to the values for the multiple parameters, including modulating and encoding the packet.

2. The method of claim 1, further comprising:
generating a second packet with an update indicator, the second packet including updated values for the values for multiple parameters;
generating a third packet with the abbreviated header including the pointer; and
transmitting the third packet to the client device according to the updated values for the multiple parameters.

3. The method of claim 2, further comprising:
receiving a confirmation message from the client device indicating the client device updated a client state table by updating a client entry associated with the pointer with the updated values for the parameters; and
based on the confirmation message, updating a manager state table by updating a manager entry associated with the pointer with the updated values.

4. The method of claim 3, wherein the confirmation message includes an acknowledgement (ACK) of the second packet.

5. The method of claim 2, further comprising transmitting the second packet with the update indicator to both the client device and a second client device in a multi-user transmission, the multi-user transmission including independent physical layer parameters for the client device and the second client device.

6. The method of claim 2, further comprising setting a single bit as either the pointer or the update indicator.

7. The method of claim 1, further comprising:
generating a second packet with the abbreviated header, the abbreviated header including a second pointer corresponding to second values for the multiple parameters; and
transmitting the second packet to the client device according to the second values for the multiple parameters.

8. The method of claim 1, further comprising, prior to the generation of the packet including the abbreviated header:
receiving a provisioning message that includes the pointer and the values for the multiple parameters; and
storing the values for the multiple parameters as associated with the pointer in a manager state table.

9. The method of claim 8, further comprising:
selecting initial values for the multiple parameters;
comparing the initial values to entries in the manager state table; and
based on the initial values not matching any of the entries in the manager state table, selecting an entry with corresponding values closest to the initial values, the selected entry including the values for the multiple parameters.

10. The method of claim 1, further comprising generating a set of pointers and corresponding values for a second client device within a same broadcasting group as the client device, the set of pointers unique within the same broadcasting group.

11. The method of claim 1, the pointer being generated by performing the many-to-one mapping function for multiple fields associated with an Institute of Electrical and Electronics Engineers (IEEE) standard.

* * * * *